US010099248B2

(12) United States Patent
Jamaluddin

(10) Patent No.: US 10,099,248 B2
(45) Date of Patent: Oct. 16, 2018

(54) PIPE COUPLING THERMAL CLEANING AND COATING CURING OVEN AND METHOD

(71) Applicant: EPCON Industrial Systems, LP, Conroe, TX (US)

(72) Inventor: Aziz A. Jamaluddin, The Woodlands, TX (US)

(73) Assignee: EPCON INDUSTRIAL SYSTEMS, LP, Conroe, TX (US)

( * ) Notice: Subject to any disclaimer, the term of this patent is extended or adjusted under 35 U.S.C. 154(b) by 290 days.

(21) Appl. No.: 15/049,565

(22) Filed: Feb. 22, 2016

(65) Prior Publication Data

US 2017/0241013 A1 Aug. 24, 2017

(51) Int. Cl.
*B05D 3/04* (2006.01)
*B05D 7/14* (2006.01)
*F16L 57/00* (2006.01)
B05D 3/02 (2006.01)
F16L 58/18 (2006.01)

(52) U.S. Cl.
CPC ............ *B05D 3/0473* (2013.01); *B05D 7/14* (2013.01); *F16L 57/00* (2013.01); *B05D 3/0254* (2013.01); *B05D 2254/00* (2013.01); *F16L 58/18* (2013.01)

(58) Field of Classification Search
CPC ... B05D 3/0473; B05D 2254/00; F16L 57/00; B05C 9/14; B05C 9/08; B05C 9/10
USPC ................................................ 118/641–643
See application file for complete search history.

(56) References Cited

U.S. PATENT DOCUMENTS

| 4,240,787 | A | 12/1980 | Jamaluddin |
| 4,242,084 | A | 12/1980 | Jamaluddin |
| 4,299,036 | A * | 11/1981 | Schregenberger ........ F27B 9/28 34/210 |
| 4,322,203 | A | 3/1982 | Jamaluddin |
| 6,135,765 | A | 10/2000 | Jamaluddin |
| 6,149,707 | A | 11/2000 | Jamaluddin |
| 7,018,201 | B1 * | 3/2006 | Pierce ..................... F26B 15/16 34/487 |
| 8,881,425 | B2 | 11/2014 | Latos |

* cited by examiner

*Primary Examiner* — Avinash Savani
*Assistant Examiner* — Rabeeul Zuberi
(74) *Attorney, Agent, or Firm* — Jeffrey L. Wendt; The Wendt Firm, P.C.

(57) ABSTRACT

Systems and methods for treating metal pipe couplings, including a frame and insulated panels attached to the frame forming an oven. A pre-heat zone and a bake zone inside the oven, the pre-heat zone separated from the bake zone by a shared oven wall. A combustion burner and recirculation blower are positioned in opposite ends of the oven in a pre-heat zone combustion/recirculation chamber. Another burner and recirculation blower pair are positioned in opposite ends of the oven in a bake zone combustion/recirculation chamber. Heated air supply plenums are fluidly connected to respective recirculation blowers, and include direction-adjustable nozzles to direct heated air generally downward onto pipe couplings moving through the preheat and bake zones. Return air plenums positioned in each of the pre-heat and bake zones each have an air inlet, and an outlet fluidly connected to respective combustion/recirculation chambers. Coating-cured metal pipe couplings made by the methods.

13 Claims, 8 Drawing Sheets

PIPE COUPLING THERMAL CLEANING AND COATING CURING OVEN AND METHOD

BACKGROUND INFORMATION

Technical Field

The present disclosure relates generally to the field of pipe coupling treatment systems, and methods of use, and more specifically to pipe coupling ovens thermal cleaning and coating ovens (systems), and methods of their use, particularly for producing internal or externally coated pipe couplings.

Background Art

It is a common practice to coat and apply protective coatings to pipes of all sorts, such as line pipes, which are buried underground, to move gasses or liquids from point A to point B. The pipe may have diameter anywhere from 2 inches, all the way to 48 inches or more and have either internal or external coatings applied, depending on the application, for corrosion protection or ease of flow. For example, line pipes and drill pipes typically have internal coated pipes to minimize friction for easy flow of fluids and have corrosion protection with the inner coating of the pipes. There are several service companies in the business of applying internal coatings to the pipes, including line pipes as well as the drill pipes.

In a typical process, a phenolic coating is applied internally, and baked on at 450-500° F. The process of coating the pipe, is typically as follows:

First Stage: burn off the old coating or oils. Sometime termed "pre-bake", "burn off" or "pre-heat", the pipe is heated to 750° F. to either burn off the old coatings on used pipe, or burn off the oils on new pipe. This process is also sometimes referred to as "thermal cleaning" of the pipe. One older technique used to be to heat up the pipe in a burn off oven, overnight, generally about 24 hours. Aziz Jamaluddin, one of the inventors of the present patent application, and president of Epcon® Industrial Systems, LP (formerly known as Entech Industrial Systems) obtained several U.S. Pat. Nos. 4,240,787; 4,242,084; and 4,322,203, allowing this thermal cleaning process to be reduced significantly in time.

Second stage: sand blasting. After thermal cleaning, the pipe is internally sandblasted to white metal and then coatings are applied in two to three stages, either liquid or powder.

Third stage: application of coating. The pipe from Stage 2 would then roll into a separate conveyorized "bake" oven, two or three in a row, each bake oven being preceded by an internal coating station. The bake oven temperature is 400-500° F.

Fourth stage: the final bake.

Along with the pipe, there are pipe couplings of various sizes—anywhere from 2.5 inch, 6 inch, 8 inch, 12 inch and up to 16 inch in diameter. Like the pipe, the couplings need to be thermally cleaned, typically at temperatures about 750° F., a coating is then applied, and then cured at 450-500° F. This task is accomplished by putting the couplings in one or more open containers or baskets inside the burnout oven and heating it for several hours or overnight at 750° F., and then the next day the couplings have the powder or liquid applied, and are then put in a different oven, operating at 450-500° F.

Various types of ovens and methods are used for the above, all generally comprising a box or container defining a treatment zone, heating apparatus such as burners for direct heating of circulating air, air circulation fans, and exhaust fans. Due to the temperature difference between the thermal treatment and the coating bake steps, separate ovens are used. The above-mentioned '203 patent describes one such thermal cleaning oven, including an elongated rectangular framework supporting a plurality of insulated panels. The supporting framework comprises a plurality of vertically extending structural steel supports, longitudinally and horizontally extending supports, and laterally and horizontally extending supports. The supports comprise steel H-beams or the like and are preferably joined by welding into a rigid framework. The oven is enclosed by longitudinally extending, vertical side walls consisting of thick-walled insulated panels, and a longitudinally extending top wall, consisting of a thick-walled insulated panel. The oven is open at one end for introduction of pipe to be processed and has a vertically sliding end door supported for vertical movement between vertical supporting H-beams. A pair of rails extend longitudinally of the oven which support the wheels of a cart for movement of a load of pipe into and out of the oven. The oven chamber or enclosure is supported from the top portion of the frame, consisting of supports and a series of shorter, the vertically extending H-beam supports which also support horizontally extending, bottom insulated panels. Obviously, these specifications can be varied, as needed, but represent a typical commercial installation. The oven has plenum chambers extending longitudinally thereof on opposite sides of the rails, each plenum chamber having a plurality of vertical slots or nozzles spaced along the entire length thereof for directing flow of heated air horizontally on to the pipe on the cart. The supply of heated air for heating the pipe to burnout temperature and the control of air pollution from the pipe burnout and recovery of waste energy are provided by equipment carried on top of the supporting frame for the oven, including burners which draw air from the oven and heat it. The heated air is recirculated to the oven by blowers. Air is exhausted slowly from the oven by an exhaust fan or blower through an incinerator, where hydrocarbon byproducts are consumed. A heat exchanger is used to heat incoming combustion air for the burner section. The air from the heat exchange section is exhausted by the blower to atmosphere. The burner section comprises a rectangular chamber enclosed by insulated panels (the side walls, end walls, top wall, and bottom wall), the sidewalls having openings in which there are positioned burners. The bottom wall of the burner chamber has a central opening, which opens into the top of the elongated oven enclosure.

During most of the operation of oven of the '203 patent, the burner chamber central opening is the only opening for circulation of air from the oven into burner chamber. End walls of the burner chamber have openings in which there are secured the inlet end and outlet end of a heat exchange conduit. This takes some of the heat away from the combustion gases from the burner that otherwise could be used to heat the pipe. The end walls of the combustion chamber also have openings for connection to the inlet sides of the recirculation blowers, which in turn have their respective outlets connected by conduits to the vertical, oppositely opposed plenum chambers. The apparatus described in the '203 patent is a batch type pipe burnout oven with air pollution control and heat recovery features.

As noted herein, the predominant technique is to employ separate ovens for thermal cleaning and coating baking, employing direct-heated air in cross-circulation flow of the air through pipes or couplings being treated, where flow direction of heated air onto the pipe or couplings (generally horizontal) is directed by side-mounted heated air plenums. While fairly efficient, this technique requires a lot of floor space due to the use of separate ovens. This limits the applicability of the technique to operations where separate ovens are available, or to use of the same oven in different operating temperature regimes, which would also be counterproductive.

It would be an advanced in the pipe coupling treatment art, and in particular the art of combustion-based thermal cleaning and coating baking, to provide a more compact, conveyorized, simplified oven having two or more treatment chambers, saving time, labor and space energy usage.

SUMMARY

In accordance with the present disclosure, apparatus, systems (ovens) and methods of treating raw metal pipe couplings and coated uncured pipe couplings using the apparatus and systems are described that may reduce or eliminate problems with known apparatus, systems, and methods.

One aspect of the disclosure is a method comprising (or consisting of, or consisting essentially of):

(a) continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce coating-cured pipe couplings;

(b) forming a first hot fluid stream (preferably a hot combustion product formed by directly heating air, oxygen-enriched air, or oxidant) in a pre-heat zone hot fluid (preferably combustion) chamber (preferably by directly heating air, oxygen-enriched air, or oxidant injected into the pre-heat zone combustion chamber by a first combustion burner), and forming a second hot fluid stream (preferably a hot combustion product formed by directly heated air, oxygen-enriched air, or oxidant) in a bake zone hot fluid (preferably combustion) chamber (preferably by directly heating air, oxygen-enriched air, or oxidant injected into the bake zone combustion chamber by a second combustion burner);

(c) flowing the first and second hot fluid streams (preferably combustion product streams, more preferably directly heated air streams) into respective pre-heat zone and bake zone hot fluid (preferably hot air) supply plenums, the pre-heat zone hot fluid supply plenum positioned above the one or more raw metal pipe couplings moving through the pre-heat zone, the bake zone hot fluid supply plenum positioned above the one or more thermally cleaned and uncured coated pipe couplings moving through the bake zone;

(d) flowing the first and second hot fluid streams (preferably combustion product streams, preferably directly heated air streams) from respective hot fluid (hot air) supply plenums generally vertically downward onto the respective pipe couplings moving through the respective zones, the first and second hot fluid (combustion product streams, preferably directly heated air streams) flowing into and around the respective one or more pipe couplings, and then exiting to left and right sides of the respective zones, forming left and right pre-heat zone cooled fluid (preferably cooled air) streams and left and right bake zone cooled fluid (preferably cooled air) streams; and (e) collecting a major portion of the left and right pre-heat zone cooled fluid (preferably cooled air) streams in respective left and right pre-heat zone return ducts, flowing the major portion of the left and right pre-heat zone cooled fluid (preferably cooled air) streams to the pre-heat zone hot fluid (preferably combustion) chamber while venting (natural draft or forced draft) a minor portion, and collecting a major portion of the left and right bake zone cooled fluid (preferably cooled air) streams in respective left and right bake zone return ducts, flowing the major portion of the left and right bake zone cooled fluid (preferably cooled air) streams to the bake zone hot fluid (preferably combustion) chamber while venting (natural draft or forced draft) a minor portion.

Another method embodiment comprises (or consists of, or consists essentially of):

(a) continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce coating-cured pipe couplings;

(b) forming a first heated air stream in a pre-heat zone combustion chamber by directly heating air injected into the pre-heat zone combustion chamber by a first combustion burner, and forming a second heated air stream in a bake zone combustion chamber by directly heating air injected into the bake zone combustion chamber by a second combustion burner;

(c) flowing the first and second heated air streams into respective pre-heat zone and bake zone heated air supply plenums, the pre-heat zone heated air supply plenum positioned above the one or more raw metal pipe couplings moving through the pre-heat zone, the bake zone heated air supply plenum positioned above the one or more thermally cleaned and uncured coated pipe couplings moving through the bake zone;

(d) flowing the first and second heated air streams from respective heated air supply plenums generally vertically downward onto the respective pipe couplings moving through the respective zones, the first and second heated air streams flowing into and around the respective one or more pipe couplings, and then exiting to left and right sides of the respective zones, forming left and right pre-heat zone cooled air streams and left and right bake zone cooled air streams; and (e) collecting a major portion of the left and right pre-heat zone cooled air streams in respective left and right pre-heat zone return ducts, flowing the major portion of the left and right pre-heat zone cooled air streams to the pre-heat zone combustion chamber while venting a minor portion, and collecting a major portion of the left and right bake zone cooled air streams in respective left and right bake zone return ducts, flowing the major portion of the left and right bake zone cooled air streams to the bake zone combustion chamber while venting a minor portion.

Another aspect of the disclosure is a system comprising (or consisting essentially of, or consisting of):

(a) a platform, generally rectangular and having longitudinal axis;
(b) a plurality of insulated panels attached to the platform and defining sidewalls, a front end wall, a rear end wall, a ceiling, and a bottom of an oven;
(c) a pre-heat zone and a bake zone inside the oven, the pre-heat zone separated from the bake zone by a shared (preferably central) internal vertical oven wall, non-insulated, extending from the front end wall to the rear end wall, and from the bottom to the ceiling of the oven;
(d) one or more pre-heat zone combustion burners and one or more pre-heat zone recirculation blowers positioned in opposite ends of the oven in a pre-heat zone combustion/recirculation chamber positioned in an upper region of the pre-heat zone, and one or more bake zone combustion burners and one or more bake zone recirculation blowers positioned in opposite ends of the oven in a bake zone combustion/recirculation chamber positioned in an upper region of the bake zone;
(e) one or more pre-heat zone heated air supply plenums and one or more bake zone heated air supply plenums, the plenums fluidly connected to respective one or more of the recirculation blowers, the heated air supply plenums comprising direction-adjustable nozzles attached to a bottom panel thereof, the heated air supply plenums positioned to direct heated air through the nozzles and generally downward onto work pieces traversing through the preheat and bake zones; and
(f) one or more return air plenums positioned generally vertically in each of the pre-heat and bake zones, the one or more return air plenums each having an air inlet below a level of the bottom panels of the one or more heated air supply plenums and an outlet fluidly connected to respective pre-heat and post bake combustion/recirculation chambers.

Another system embodiment of this disclosure comprises (or consists essentially of, or consists of):
(a) a platform, generally rectangular and having longitudinal axis;
(b) a plurality of insulated panels attached to the platform and defining left and right sidewalls, a front end wall, a rear end wall, a ceiling, and a bottom of an oven;
(c) a pre-heat zone and a bake zone inside the oven, the pre-heat zone separated from the bake zone by a shared internal vertical oven wall, non-insulated, extending from the front end wall to the rear end wall and centrally positioned between the left and right sidewalls, and extending from the bottom to the ceiling of the oven;
(d) one or more pre-heat zone combustion burners and one or more pre-heat zone recirculation blowers positioned in opposite ends of the oven in a pre-heat zone combustion/recirculation chamber positioned in an upper region of the pre-heat zone, and one or more bake zone combustion burners and one or more bake zone recirculation blowers positioned in opposite ends of the oven in a bake zone combustion/recirculation chamber positioned in an upper region of the bake zone;
(e) one or more pre-heat zone heated air supply plenums and one or more bake zone heated air supply plenums, the plenums fluidly connected to respective one or more of the recirculation blowers, the heated air supply plenums comprising direction-adjustable nozzles attached to a bottom panel thereof, the heated air supply plenums positioned to direct heated air through the nozzles and generally downward onto work pieces traversing through the preheat and bake zones;
(f) one or more return air plenums positioned generally vertically in each of the pre-heat and bake zones, the one or more return air plenums each having an air inlet below a level of the bottom panels of the one or more heated air supply plenums and an outlet fluidly connected to respective pre-heat and post bake combustion/recirculation chambers; and
(g) separate first and second reversible conveyors positioned to transport work pieces separately through the pre-heat zone and bake zone.

Coating-cured pipe couplings made according to one of the methods of this disclosure are also considered within this disclosure.

Systems, apparatus, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
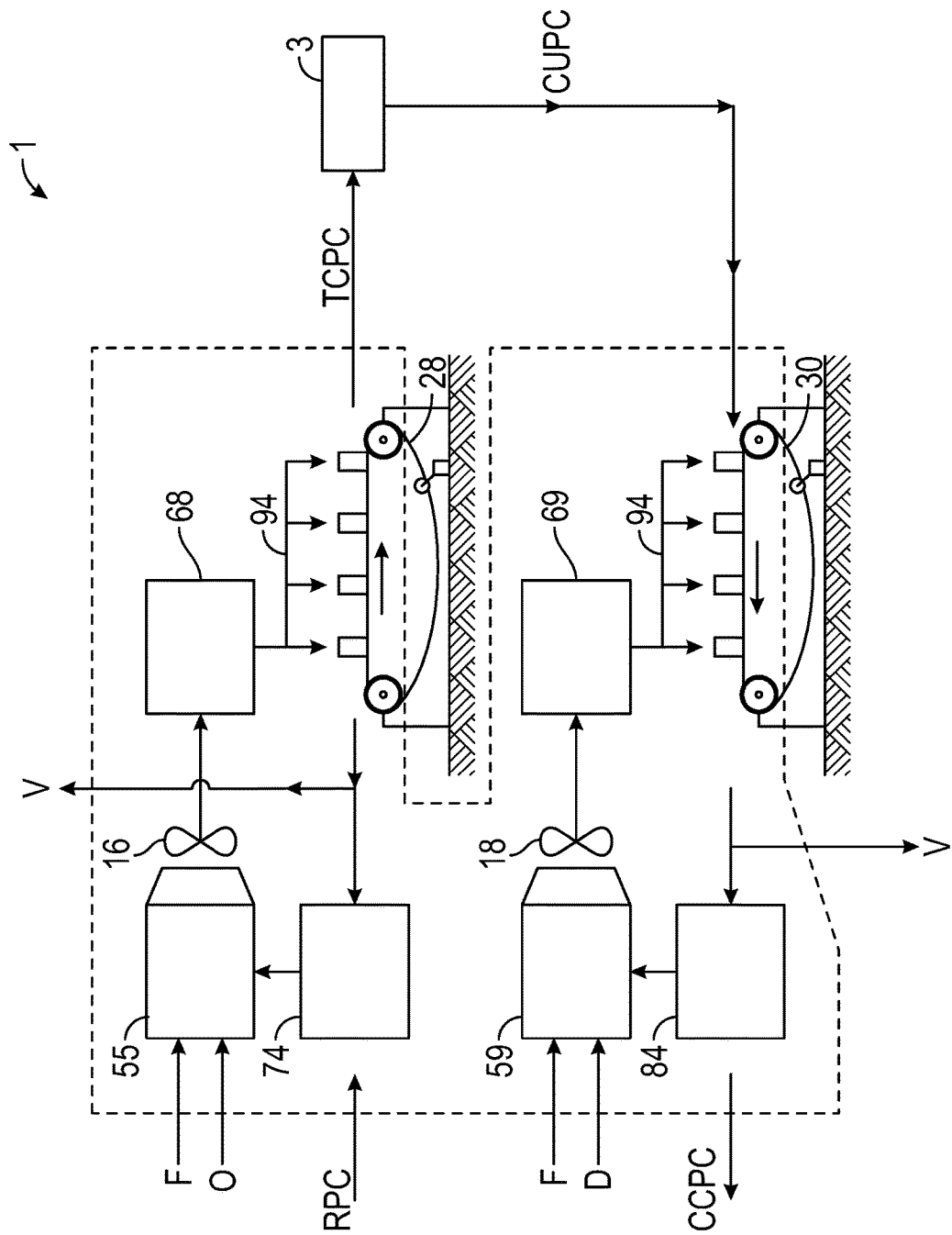
FIG. 1 is a schematic process flow diagram of one method, system, and apparatus embodiment in accordance with the present disclosure.

It is to be noted, however, that the appended drawings are schematic in nature, may not be to scale (in particular FIGS. 2-10), and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed systems, apparatus, and methods. However, it will be understood by those skilled in the art that the systems, apparatus, and methods covered by the claims may be practiced without these details and that numerous variations or modifications from the specifically described embodiments may be possible and are deemed within the claims. For example, wherever the term "comprising" is used, embodiments and/or components and or steps where "consisting essentially of" and "consisting of" are explicitly disclosed herein and are part of this disclosure. All published patent applications and patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, the predominant technique is to employ separate ovens for thermal cleaning and coating baking, employing direct-heated air in cross-circulation flow of the air through pipes or couplings being treated, where flow direction of heated air onto the pipe or couplings (generally horizontal) is directed by side-mounted heated air plenums. While fairly efficient, this technique requires a lot of floor space due to the use of separate ovens. This limits the applicability of the technique to operations where separate ovens are available, or to use of the same oven in different operating temperature regimes, which would also be counterproductive.

It would be an advanced in the pipe coupling treatment art, and in particular the art of combustion-based thermal cleaning and coating baking, to provide a more compact, conveyorized, simplified oven having two or more treatment chambers, saving time, labor and space energy usage. The present application is devoted to resolving one or more of these challenges.

One aspect of the disclosure is a method comprising (or consisting of, or consisting essentially of):

(a) continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce coating-cured pipe couplings;

(b) forming a first hot fluid stream (preferably a hot combustion product formed by directly heating air, oxygen-enriched air, or oxidant) in a pre-heat zone hot fluid (preferably combustion) chamber (preferably by directly heating air, oxygen-enriched air, or oxidant injected into the pre-heat zone combustion chamber by a first combustion burner), and forming a second hot fluid stream (preferably a hot combustion product formed by directly heated air, oxygen-enriched air, or oxidant) in a bake zone hot fluid (preferably combustion) chamber (preferably by directly heating air, oxygen-enriched air, or oxidant injected into the bake zone combustion chamber by a second combustion burner);

(c) flowing the first and second hot fluid streams (preferably combustion product streams, more preferably directly heated air streams) into respective pre-heat zone and bake zone hot fluid (preferably hot air) supply plenums, the pre-heat zone hot fluid supply plenum positioned above the one or more raw metal pipe couplings moving through the pre-heat zone, the bake zone hot fluid supply plenum positioned above the one or more thermally cleaned and uncured coated pipe couplings moving through the bake zone;

(d) flowing the first and second hot fluid streams (preferably combustion product streams, preferably directly heated air streams) from respective hot fluid (hot air) supply plenums generally vertically downward onto the respective pipe couplings moving through the respective zones, the first and second hot fluid (combustion product streams, preferably directly heated air streams) flowing into and around the respective one or more pipe couplings, and then exiting to left and right sides of the respective zones, forming left and right pre-heat zone cooled fluid (preferably cooled air) streams and left and right bake zone cooled fluid (preferably cooled air) streams; and (e) collecting a major portion of the left and right pre-heat zone cooled fluid (preferably cooled air) streams in respective left and right pre-heat zone return ducts, flowing the major portion of the left and right pre-heat zone cooled fluid (preferably cooled air) streams to the pre-heat zone hot fluid (preferably combustion) chamber while venting (natural draft or forced draft) a minor portion, and collecting a major portion of the left and right bake zone cooled fluid (preferably cooled air) streams in respective left and right bake zone return ducts, flowing the major portion of the left and right bake zone cooled fluid (preferably cooled air) streams to the bake zone hot fluid (preferably combustion) chamber while venting (natural draft or forced draft) a minor portion.

Certain methods of this disclosure include those wherein the hot fluid streams may be hot combustion products, and the hot fluid chambers are combustion chambers, and the hot combustion products may be formed by combusting one or more fuels with one or more oxidants in one or more combustion burners attached to the structure externally of the respective combustion chambers, the one or more combustion burners exhausting directly into the respective combustion chambers.

Certain methods of this disclosure include those wherein the forming a first hot combustion product comprises forming a directly heated air, oxygen-enriched air, or oxidant stream in the pre-heat zone combustion chamber by directly heating air, oxygen-enriched air, or oxidant injected into the pre-heat zone combustion chamber by a first combustion burner, and the forming a second hot combustion product comprises forming a directly heated air, oxygen-enriched air, or oxidant stream in the bake zone combustion chamber by directly heating air, oxygen-enriched air, or oxidant injected into the bake zone combustion chamber by a second combustion burner.

Certain methods of this disclosure include those wherein the fuel may be natural gas, the oxidant may be air, and the first and second hot combustion product streams may be first and second directly heated air streams.

In certain methods of this disclosure any one of, or any combination of, steps (b)-(e) may be continuous and carried out simultaneously with step (a). Certain methods of this disclosure include those wherein step (a) may comprise continuously moving one or more raw metal pipe couplings through the pre-heat zone of the structure horizontally, and separately continuously moving the thermally cleaned pipe couplings having an uncured coating applied to at least a portion thereof through the separate bake zone of the same structure horizontally, both continuous movements being parallel to a longitudinal axis of the structure. In certain methods the horizontal movements may be in opposite directions.

Certain methods of this disclosure include those wherein the venting of the minor portions may comprise exhausting minor portions of the cooled streams at a rate and amount sufficient to maintain a negative pressure in and near inlet and outlet vestibules of the pre-heat and bake zones.

Certain methods of this disclosure include those wherein the fuel is selected from the group consisting of methane, gaseous natural gas, liquefied natural gas, propane, butane, hydrogen, steam-reformed natural gas, atomized hydrocarbon oil, combustible powders, flowable solids, waste materials, slurries, and mixtures or other combinations thereof, and the oxidant is selected from the group consisting of air, gases having the same molar concentration of oxygen as air, oxygen-enriched air having 50 mole percent or more oxygen, industrial grade oxygen, food grade oxygen, and cryogenic oxygen.

Certain methods of this disclosure include those wherein the time and temperature sufficient to produce thermally cleaned pipe couplings ranges from about 1 to about 4 hours at temperature ranging from about 600° F. to about 800° F., and the time and temperature sufficient to produce cured coatings ranges from about 1 to about 4 hours at temperature ranging from about 350° F. to about 550° F.

Certain methods of this disclosure include controlling thermal cleaning of the one or more pipe couplings by one or more control methods selected from the group consisting of monitoring composition of the vented fluid from the pre-heat zone, temperature of the pre-heat zone combustion chamber, temperature of raw pipe couplings moving though the pre-heat zone, fuel and/or oxidant flow rate to the one or more pre-heat zone combustion burners, rate of moving the raw pipe couplings thought the pre-heat zone, and combinations thereof, and controlling baking of the coating of the one or more pipe couplings by one or more control methods selected from the group consisting of monitoring composition of vented fluid from the bake zone, temperature of the bake zone combustion chamber, temperature of thermally cleaned and uncured coated pipe couplings moving though the bake zone, fuel and/or oxidant flow rate to the one or more bake zone combustion burners, rate of moving the thermally cleaned uncured coated pipe couplings thought the bake zone, and combinations thereof.

Another method embodiment comprises (or consists of, or consists essentially of):
(a) continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce cured coatings;
(b) forming a first heated air stream in a pre-heat zone combustion chamber by directly heating air injected into the pre-heat zone combustion chamber by a first combustion burner, and
forming a second heated air stream in a bake zone combustion chamber by directly heating air injected into the bake zone combustion chamber by a second combustion burner;
(c) flowing the first and second heated air streams into respective pre-heat zone and bake zone heated air supply plenums, the pre-heat zone heated air supply plenum positioned above the one or more raw metal pipe couplings moving through the pre-heat zone, the bake zone heated air supply plenum positioned above the one or more thermally cleaned and uncured coated pipe couplings moving through the bake zone;
(d) flowing the first and second heated air streams from respective heated air supply plenums generally vertically downward onto the respective pipe couplings moving through the respective zones, the first and second heated air streams flowing into and around the respective one or more pipe couplings, and then exiting to left and right sides of the respective zones, forming left and right pre-heat zone cooled air streams and left and right bake zone cooled air streams; and
(e) collecting a major portion of the left and right pre-heat zone cooled air streams in respective left and right pre-heat zone return ducts, flowing the major portion of the left and right pre-heat zone cooled air streams to the pre-heat zone combustion chamber while venting a minor portion, and collecting a major portion of the left and right bake zone cooled air streams in respective left and right bake zone return ducts, flowing the major portion of the left and right bake zone cooled air streams to the bake zone combustion chamber while venting a minor portion.

Another aspect of the disclosure is a system comprising (or consisting essentially of, or consisting of):
(a) a platform, generally rectangular and having longitudinal axis;
(b) a plurality of insulated panels attached to the platform and defining sidewalls, a front end wall, a rear end wall, a ceiling, and a bottom of an oven;
(c) a pre-heat zone and a bake zone inside the oven, the pre-heat zone separated from the bake zone by a shared (preferably central) internal vertical oven wall, non-insulated, extending from the front end wall to the rear end wall, and from the bottom to the ceiling of the oven;
(d) one or more pre-heat zone combustion burners and one or more pre-heat zone recirculation blowers positioned in opposite ends of the oven in a pre-heat zone combustion/recirculation chamber positioned in an upper region of the pre-heat zone, and one or more bake zone combustion burners and one or more bake zone recirculation blowers positioned in opposite ends of the oven in a bake zone combustion/recirculation chamber positioned in an upper region of the bake zone;
(e) one or more pre-heat zone heated air supply plenums and one or more bake zone heated air supply plenums, the plenums fluidly connected to respective one or more of the recirculation blowers, the heated air supply plenums comprising direction-adjustable nozzles attached to a bottom panel thereof, the heated air supply plenums positioned to direct heated air through the nozzles and generally downward onto work pieces traversing through the preheat and bake zones; and
(f) one or more return air plenums positioned generally vertically in each of the pre-heat and bake zones, the one or more return air plenums each having an air inlet below a level of the bottom panels of the one or more heated air supply plenums and an outlet fluidly connected to respective pre-heat and post bake combustion/recirculation chambers.

Certain systems of this disclosure include those wherein the insulated bottom panel rests of a top portion of the platform, and the system further comprises pre-heat and bake zone conveyors adapted to transport work pieces separately through the pre-heat and bake zones, each conveyor having inlet end and outlet end support sprocket wheels attached to respective ends of the platform, the sprocket wheels sized and positioned to allow respective endless belts to pass through the respective pre-heat and bake zones above the insulated bottom of the oven, and between the upper portion of the platform and a lower portion of the platform. In certain systems one or both of the conveyors may comprise a reversible driver.

Certain systems of this disclosure include those wherein
the one or more pre-heat zone heated air supply plenums
comprises a single plenum,
the one or more bake zone heated air supply plenums
comprises a single plenum, and
the plenums are configured horizontally and co-extensively with their respective zones, and parallel to the longitudinal axis of the oven,
each plenum having a decreasing cross-sectional area in the direction of airflow therethrough,
each plenum fluidly connected to respective outlet ducts of a single recirculating air blower in each zone.

Certain systems of this disclosure include those wherein the heated air plenums each comprise a plurality of horizontal sheet metal panels and a plurality of horizontal sheet metal nozzles adjustably attached between respective horizontal sheet metal panels using a plurality of threaded members (screws or bolts), the horizontal nozzles adjustable in forward and rear directions depending on adjustment in and out of the plurality of threaded members.

Certain systems of this disclosure include an exhaust port for each of the pre-heat and bake zones, the exhaust ports fluidly connected to at least one exhaust fan via corresponding ducts.

Certain systems of this disclosure include those wherein each of the pre-heat and bake zones comprises a curtained inlet vestibule to allow entrance of work pieces, and a curtained outlet vestibule to allow exit of work pieces to, the vestibules configured contain heat and air inside the oven and maintain low or very low negative pressure (say 1% or 2% vacuum) inside the oven at and near the vestibules. Certain systems of this disclosure include those wherein the pre-heat inlet vestibule and the post bake outlet vestibule are attached to the front end wall, and the post bake inlet vestibule and the pre-heat outlet vestibule are attached to the rear end wall.

Certain systems of this disclosure include those wherein
the one or more pre-heat zone combustion burners is a single combustion burner in the rear end wall,
the one or more pre-heat zone recirculation blowers is a single recirculation blower in the front end wall,
the one or more bake zone combustion burners is a single combustion burner in the rear end wall, and
the one or more bake zone recirculation blowers is a single recirculation blower in the front end wall.

Certain systems of this disclosure include those wherein the one or more pre-heat zone combustion burners and the one or more bake zone combustion burners are nozzle-mixing, gas fired, refractory-less burners.

Another system embodiment of this disclosure comprises (or consists essentially of, or consists of):
 (a) a platform, generally rectangular and having longitudinal axis;
 (b) a plurality of insulated panels attached to the platform and defining left and right sidewalls, a front end wall, a rear end wall, a ceiling, and a bottom of an oven;
 (c) a pre-heat zone and a bake zone inside the oven, the pre-heat zone separated from the bake zone by a shared internal vertical oven wall, non-insulated, extending from the front end wall to the rear end wall and centrally positioned between the left and right sidewalls, and extending from the bottom to the ceiling of the oven;
 (d) one or more pre-heat zone combustion burners and one or more pre-heat zone recirculation blowers positioned in opposite ends of the oven in a pre-heat zone combustion/recirculation chamber positioned in an upper region of the pre-heat zone, and one or more bake zone combustion burners and one or more bake zone recirculation blowers positioned in opposite ends of the oven in a bake zone combustion/recirculation chamber positioned in an upper region of the bake zone;
 (e) one or more pre-heat zone heated air supply plenums and one or more bake zone heated air supply plenums, the plenums fluidly connected to respective one or more of the recirculation blowers, the heated air supply plenums comprising direction-adjustable nozzles attached to a bottom panel thereof, the heated air supply plenums positioned to direct heated air through the nozzles and generally downward onto work pieces traversing through the preheat and bake zones;
 (f) one or more return air plenums positioned generally vertically in each of the pre-heat and bake zones, the one or more return air plenums each having an air inlet below a level of the bottom panels of the one or more heated air supply plenums and an outlet fluidly connected to respective pre-heat and post bake combustion/recirculation chambers; and
 (g) separate first and second reversible conveyors positioned to transport work pieces separately through the pre-heat zone and bake zone.

Coated pipe couplings made according to one of the methods of this disclosure are also considered within this disclosure.

The ovens of the present disclosure are very uniquely designed (despite the fact that in certain embodiments they may be constructed from commonly available components, such as burners, blowers, and standard designed insulated oven panels (walls)) to provide a specific airflow pattern about pipe couplings carried by metal baskets, stands, or other carriers, on conveyors to be used with the oven. In a very general sense, the ovens of the present disclosure comprise at least two distinct zones: a raw pipe coupling pre-heat and thermal cleaning zone (referred to herein as simply a "pre-heat zone"), and an uncured, coated pipe coupling curing zone (referred to herein as simply a "bake zone"). The pipe couplings and containers therefore in part define the airflow pattern in these zones. The ovens of the present disclosure include a source or sources of directly heated fluid (in most embodiments, air, and this will be assumed from here on), the directly heated air including combustion gases if combustion burners are the source of heat. The heated air is routed by one or more blowers to internal, generally horizontal heated air plenums, and then from the heated air plenums downward onto the pipe couplings being carried on conveyor belts, the air being cooled while contacting the pipe couplings. The cooled air collects in return air plenums positioned along the sides of the pre-heat and bake zones, and is routed generally vertically upward and into unique combustion/recirculation chambers positioned in the upper regions of the oven, one in the pre-heat zone, and one in the bake zone. In these combustion/recirculation chambers (assuming heat is provided by combustion burners) each chamber includes one or more combustion burners exhausting directly into the chamber, typically but not necessarily at one end, and each chamber further includes a recirculation blower, typically but not necessarily at the opposite end) that completes the cycle by blowing the heated air into the hot air plenums. Some of the cooled air is vented through ducts, either by natural draft, or via one or more exhaust fans, to maintain a slight negative pressure at inlet and outlet curtained vestibules on the front and rear ends of the oven. The one or more recirculation blowers in each chamber, and one or more exhaust blowers may be used to control airflow, providing positive and negative pressure where needed in the oven. This is a continuous oven provided with hot air supply plenums with specially arranged nozzles.

Various terms are used throughout this disclosure. "Direct heating" as used herein means that hot air or combustion gases emanate from combustion burners or combustion burner panels, or other heat sources (Joule electric coils) and then intimately mix and combine with, preferably in a flowing fashion to increase heat transfer, one or more streams of cooled air as described herein. The burners or burner panels or electric heating coils may be ceiling or wall-mounted (including end walls and/or side walls), or any combination thereof (for example, two side wall-mounted burners and one end wall mounted burner panel or electric heater). Burner panels may form part of an oven ceiling and/or wall structure. A "burner panel" is simply a panel equipped to emit fuel and oxidant, or in some embodiments only one of these (for example one burner panel may only emit fuel, while another burner panel emits only oxidant, and vice versa). A "plenum" is a space in which a gas, usually air, is contained at a pressure greater than atmospheric pressure.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. "Exhaust", "burner exhaust", and "burner flue gas" are equivalent terms and refer to a combination of combustion gases and other effluent from combustion burners, such as adsorbed water, water of hydration, $CO_2$ and $H_2O$ liberated from combustion of hydrocarbons, and the like. Therefore exhaust may comprise oxygen or other oxidants, nitrogen, combustion products (including but not limited to, carbon dioxide, carbon monoxide, $NO_x$, $SO_x$, $H_2S$, and water) and uncombusted fuel.

"Oxidant" as used herein includes air, gases having the same molar concentration of oxygen as air (for example "synthetic air"), oxygen-enriched air (air having oxygen concentration greater than 21 mole percent), and "pure" oxygen grades, such as industrial grade oxygen, food grade oxygen, and cryogenic oxygen. Oxygen-enriched air may have 50 mole percent or more oxygen, and in certain embodiments may be 90 mole percent or more oxygen. Primary, secondary, and tertiary oxidant are terms understood in the combustion burner art; burners employed herein may use any one or more of these.

The term "fuel", according to this disclosure, means a combustible composition comprising a major portion of, for example, methane, natural gas, liquefied natural gas, propane, butane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facilities, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Referring now to the drawings, where the same numerals and letters are used throughout unless otherwise noted, FIG. 1 is a schematic process flow diagram of one method, system, and apparatus embodiment (1) in accordance with the present disclosure. The dashed line represents the boundary of the oven. It will be realized that the diagram is highly schematic and is intended to be used in further understanding the more detailed drawings to follow. Fuel (F) and an oxidant (O) are routed to a pre-heat zone combustion/recirculation chamber 55, and a pre-heat zone recirculation blower 16 routes heated air to a pre-heat zone hot air supply plenum 68, which in turn routes hot air through a plurality of generally downward-facing nozzles 94 onto baskets or other containers holding pipe couplings on a pre-heat zone conveyor 28. Meanwhile, cooled air is routed to one or more pre-heat zone cooled air plenums 74, a small amount being vented (V) from the pre-heat zone. Raw pipe couplings (RPC) are routed into the oven and onto pre-heat zone conveyor 28, and after remaining in the pre-zone for a time and at a temperature sufficient to thermally clean the RPC, are converted into thermally cleaned pipe couplings (TCPC), which are then routed to a coating station 3. Coating station 3 applies a powder or fluid coating (uncured) to the TCPC, and these coated uncured pipe couplings (CUPC) are then routed back to the same oven but to a different zone, a bake zone having a bake zone conveyor 30. Fuel (F) and oxidant (O) are routed into a bake zone combustion/recirculation chamber 59, and a bake zone recirculation blower 18 routes heated air to a bake zone hot air supply plenum 69, which in turn routes hot air through a plurality of generally downward-facing nozzles 94 onto baskets or other containers holding pipe couplings on a bake zone conveyor 30. Meanwhile, cooled air is routed to one or more bake zone cooled air plenums 84, a small amount being vented (V) from the bake zone.

Figure 2:
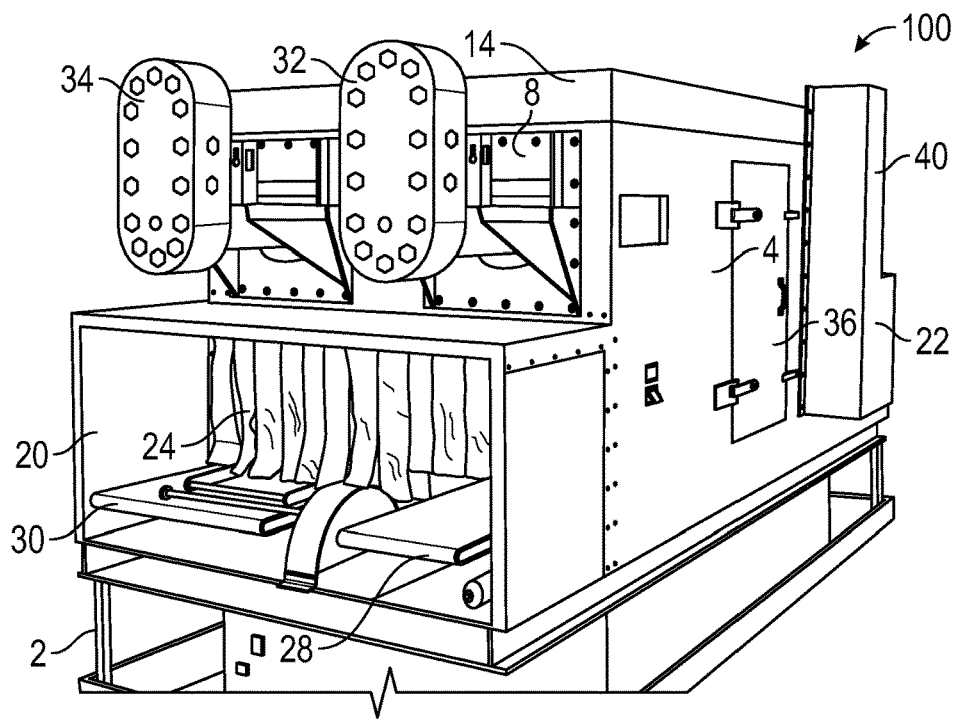
FIGS. 2 and 3 are schematic right and left perspective views of one oven embodiment in accordance with the present disclosure.
Figure 3:
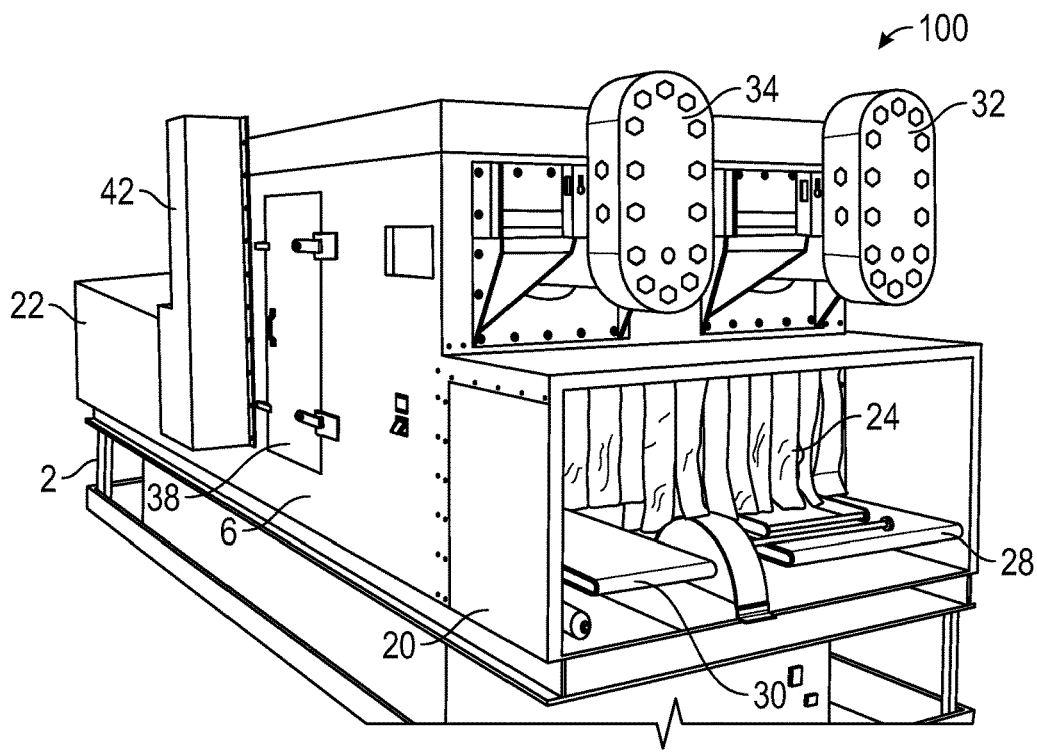

FIGS. 2 and 3 are schematic right and left perspective views of one prototype oven embodiment 100 in accordance with the present disclosure. It is deemed a prototype since not all of the components are installed, such as fuel conduits, exhaust fan, and control panel, these items being illustrated schematically in embodiment 200, FIG. 4. Oven prototype embodiment 100 includes a platform 2, to which are fastened insulated panels forming a right sidewall 4, left sidewall 6, front end wall 8, rear end wall 10, bottom 12, and ceiling or roof 14. Front end and rear end curtained vestibules 20, 22 are illustrated, with front and rear curtains 24, 26, formed from plastic strips attached to the inside top of the vestibules, and set back a distance from the inlet and exit of the vestibules, perhaps 6 to 8 inches. Guards 32, 34 for pre-heat zone and bake zone recirculation blowers, respectively are illustrated, as well as a pre-heat zone access door 36 and a bake zone access door 38. Insulated vent ducts for pre-heat zone and bake zone are illustrated at 40, 42.

Figure 4:
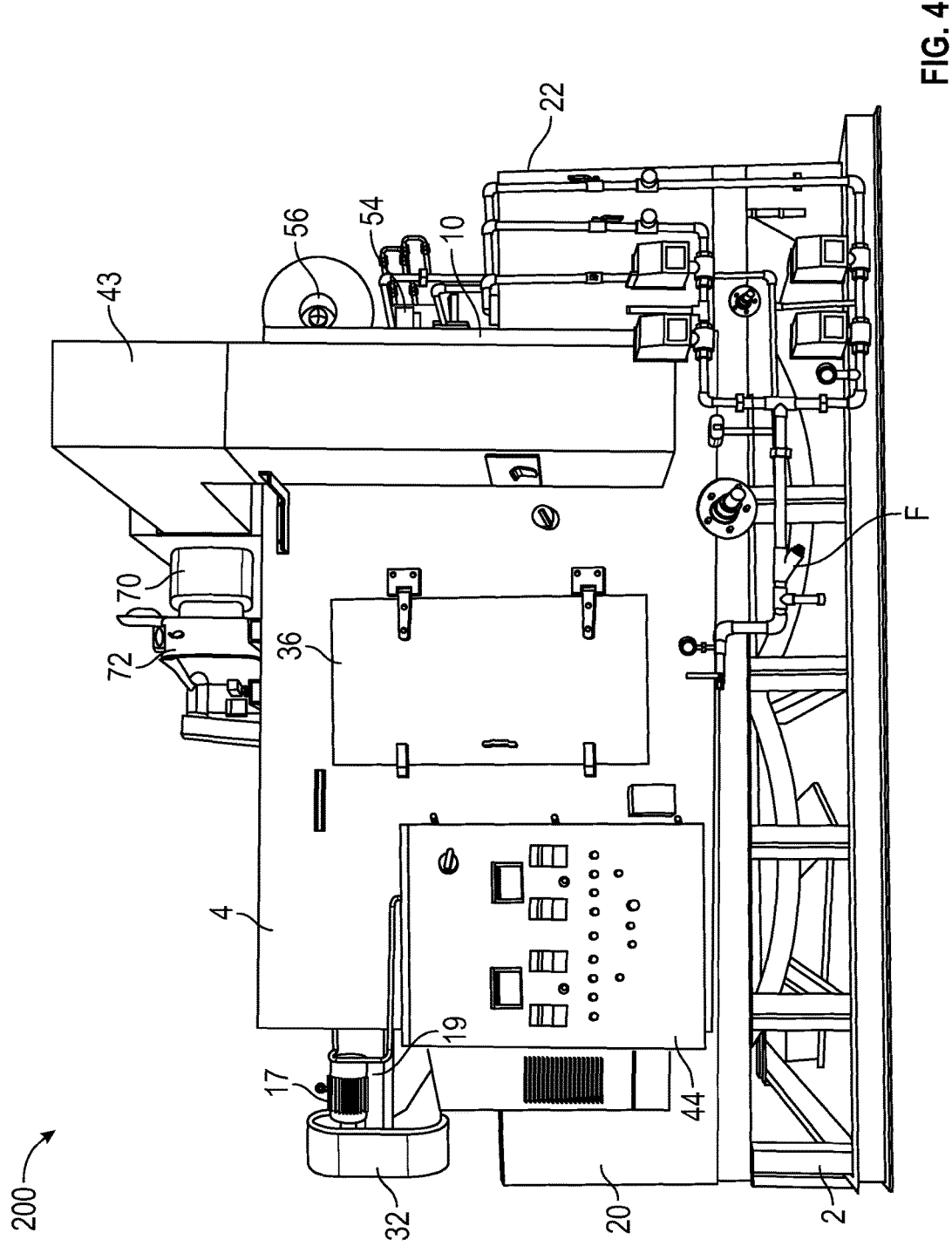
FIG. 4 is a schematic side elevation view of another oven embodiment in accordance with the present disclosure.

FIG. 4 is a schematic side elevation view of another oven embodiment 200 in accordance with the present disclosure, illustrating pre-heat zone blower motor 17 and support 19, control panel 44, fuel conduits (F), insulation 43 on vent ducts, exhaust fan 70, and exhaust fan motor 72 mounted atop the oven. Pre-heat zone combustion burner 54 and air blower therefore, 56, are also illustrated attached directly to the oven rear end wall 10.

Figure 5:
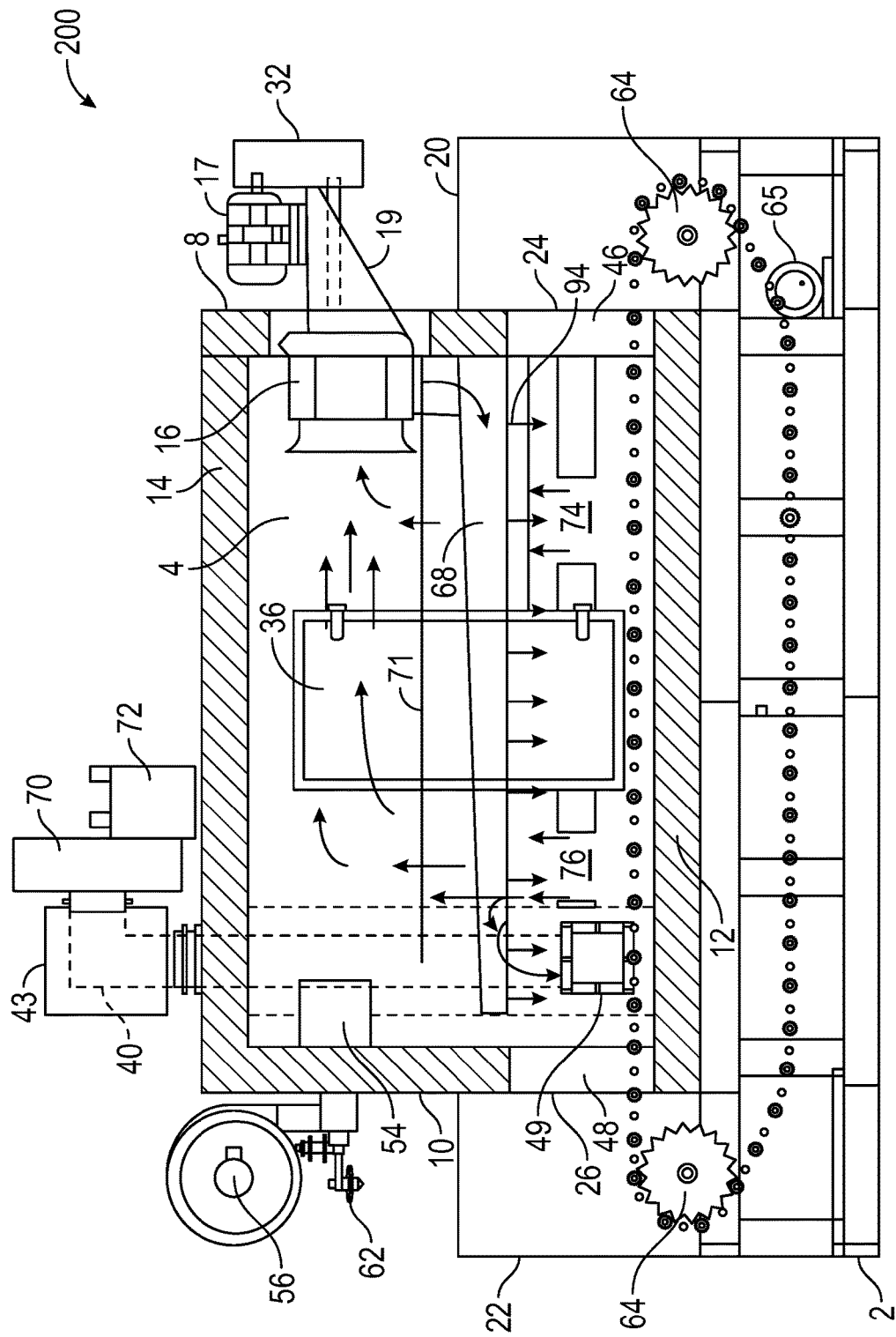
FIGS. 5, 6, and 8 are schematic cross-sectional, plan and rear end elevation views, respectively, with portions cut away to show internal air flow patterns, of the embodiment of FIG. 4.
Figure 6:
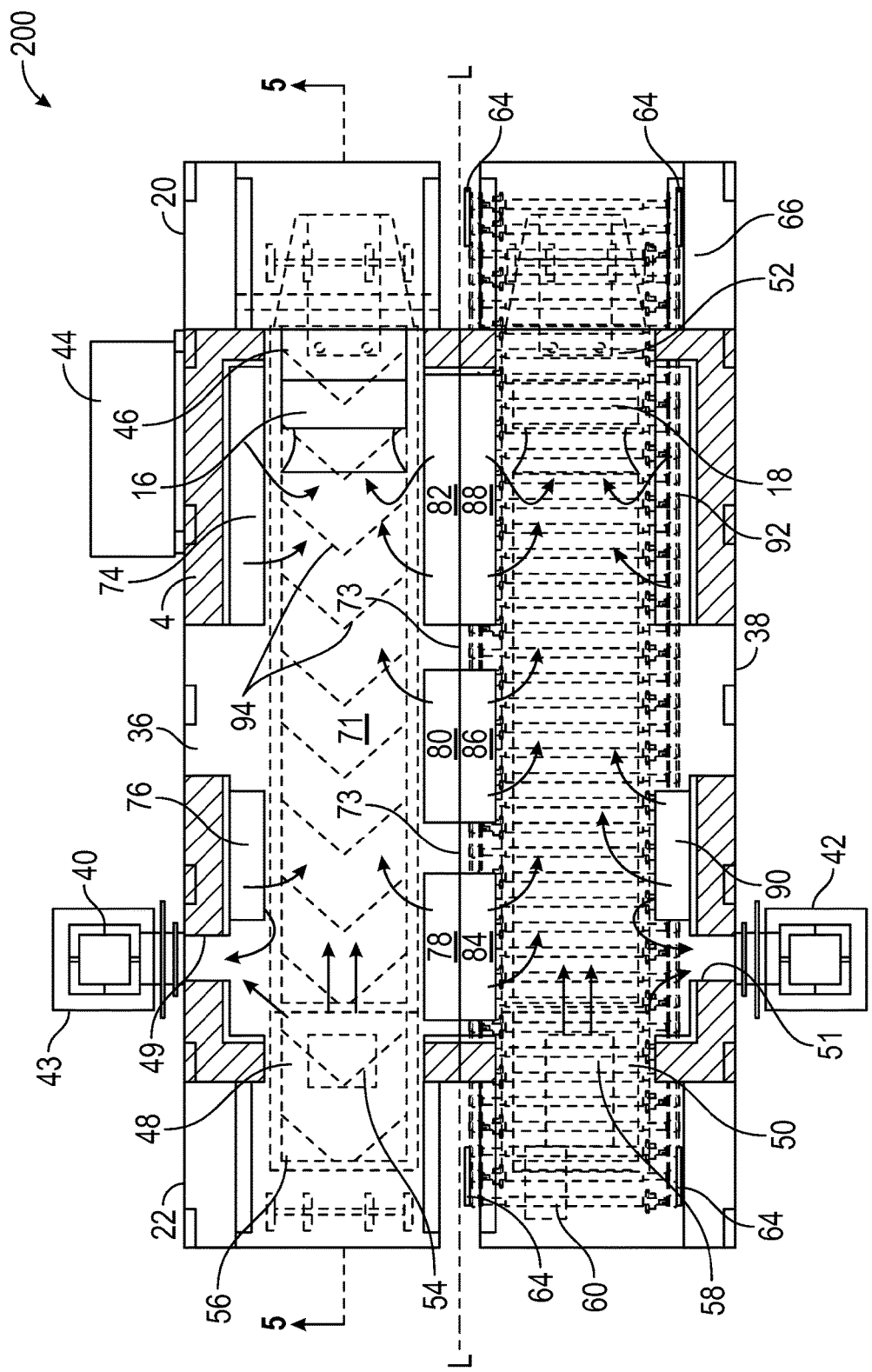
Figure 8:
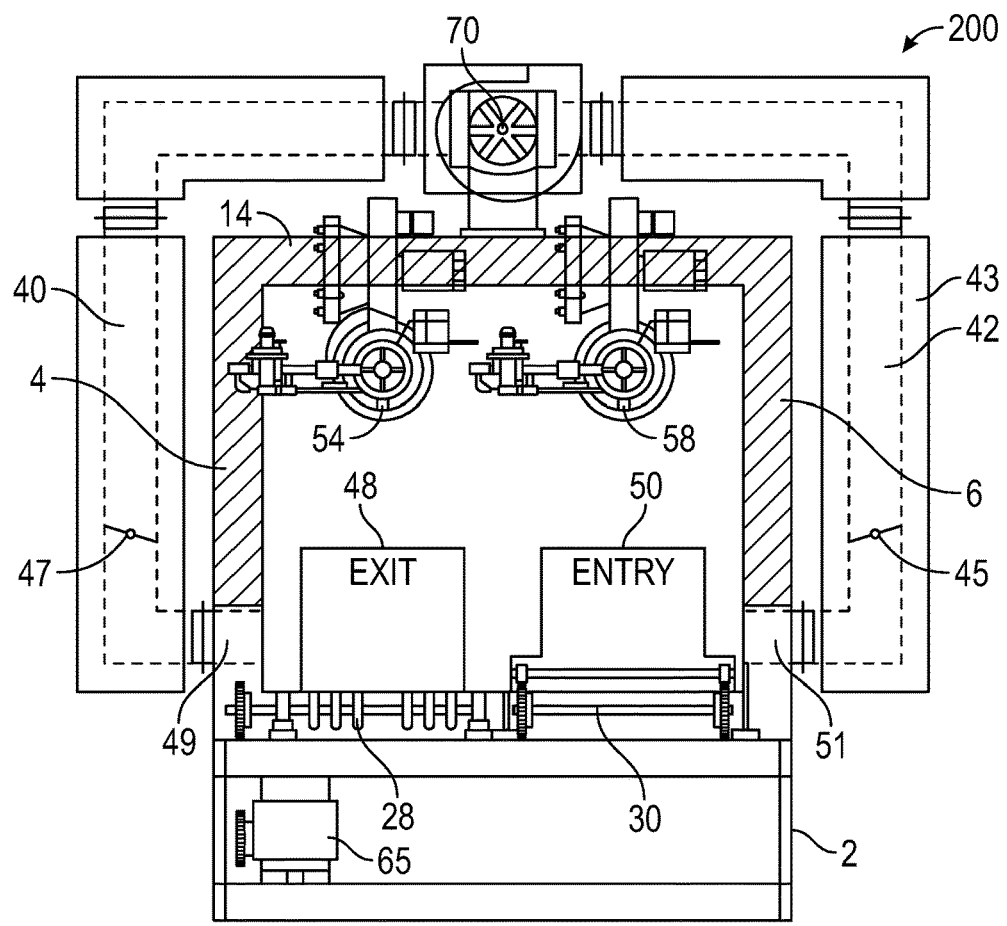

FIGS. 5, 6, and 8 are schematic cross-sectional, plan and rear end elevation views, respectively, with portions cut away to show internal air flow patterns, of embodiment 200. Illustrated are pre-heat zone inlet 46, pre-heat zone outlet 48, bake zone inlet 50, and bake zone 52, as well as pre-heat zone and bake zone vent passages 49, 51, with dampers 45, 47 illustrated in FIG. 8. The oven has a longitudinal axis (L) as illustrated in FIG. 6. Illustrated in phantom in FIG. 6 are bake zone combustion burner 58 and burner air injection blower 60. Natural gas or other fuel regulator 62 may be seen schematically in FIG. 5. Various sprocket wheels 64 are illustrated, four for each of conveyors 28, 30, and a pair of conveyor driver motors 65, 66, one for each conveyor.

An important feature of the inventive systems and methods of this disclosure is the airflow, and components uniquely designed to produce the airflows in the ovens. One important component is the lower, generally horizontal panel 71, viewable in FIG. 5, which functions as the lower panel for the pre-heat zone combustion/recirculation chamber, which is defined generally by panel 71, sidewall 4, a portion of (preferably one half of) front end wall 8, and a portion of (preferably one half of) rear end wall 10, and a partition panel 73 that physically separates the oven into pre-heat zone (PHZ) and bake zone (BZ). A similar lower panel, not viewable in FIG. 5, functions as the lower panel for the bake zone combustion/recirculation chamber, which is defined similarly or identically to the pre-heat zone combustion/recirculation chamber, but for the fact that it is on the other side of partition panel 73. Other important features are the provision of cooled air return ducts (sometimes simply referred to as "returns") in the pre-heat and bake zones. The pre-heat zone includes cooled air returns 74, 76, 78, 80, and 82, while bake zone includes cooled air returns 84, 86, 88, 90, and 92. In embodiment 200, all of the cooled air returns are essentially rectangular boxes having inlets just above, and on the periphery of their respective conveyors, and outlets opening into their respective combustion/recirculation chamber. In this way, hot air emanates from nozzles 94 on the bottom of pre-heat zone hot air supply plenum 68, passes around and through raw pipe couplings being thermally cleaned, and then to the sides and out and up through cooled air returns 74, 76, 78, 80, and 82, as indicated in FIGS. 5 and 6 by the various curved single-headed arrows. Simultaneously, hot air emanates from nozzles 94 on the bottom of bake zone hot air supply plenum 69, passes around and through coated, uncured pipe couplings to cure the coatings, and then to the sides and out and up through cooled air returns 84, 86, 88, 90, and 92, also as indicated in FIGS. 5 and 6. Small amounts of cooled air from each zone are vented through openings 49, 51, in the pre-heat and bake zones, as illustrated. Vent openings 49, 51, also draw small amounts of air from around the vestibules, thus maintaining a slight negative air pressure in the vestibules 20, 22.

Figure 7:
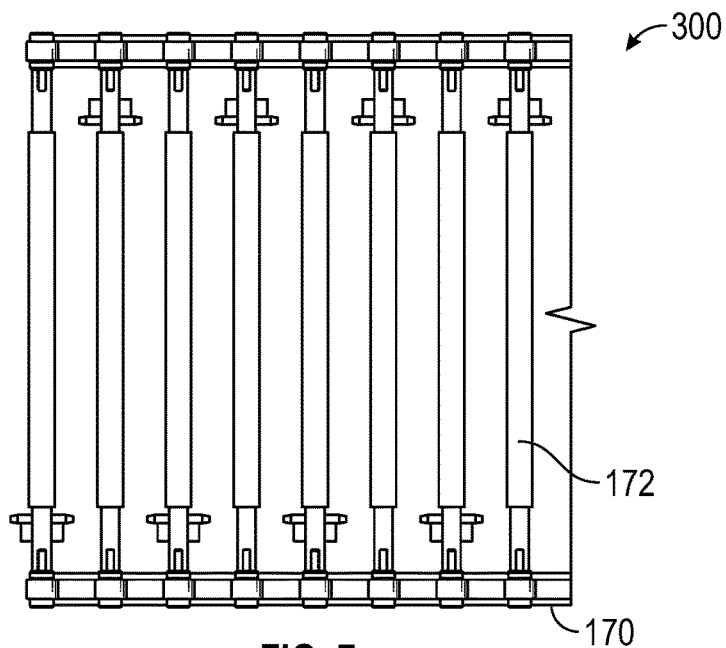
FIG. 7 is a detailed plan view of a conveyor roller set useful in the systems and methods of the disclosure.

FIG. 7 is a detailed plan view of a conveyor roller set useful in the systems and methods of the disclosure, illustrating side chains 170 and rollers 172. As these components are well understood by those skilled in the conveyor art, their construction is not further detailed, except for their materials of construction, which are described herein.

Figure 9:
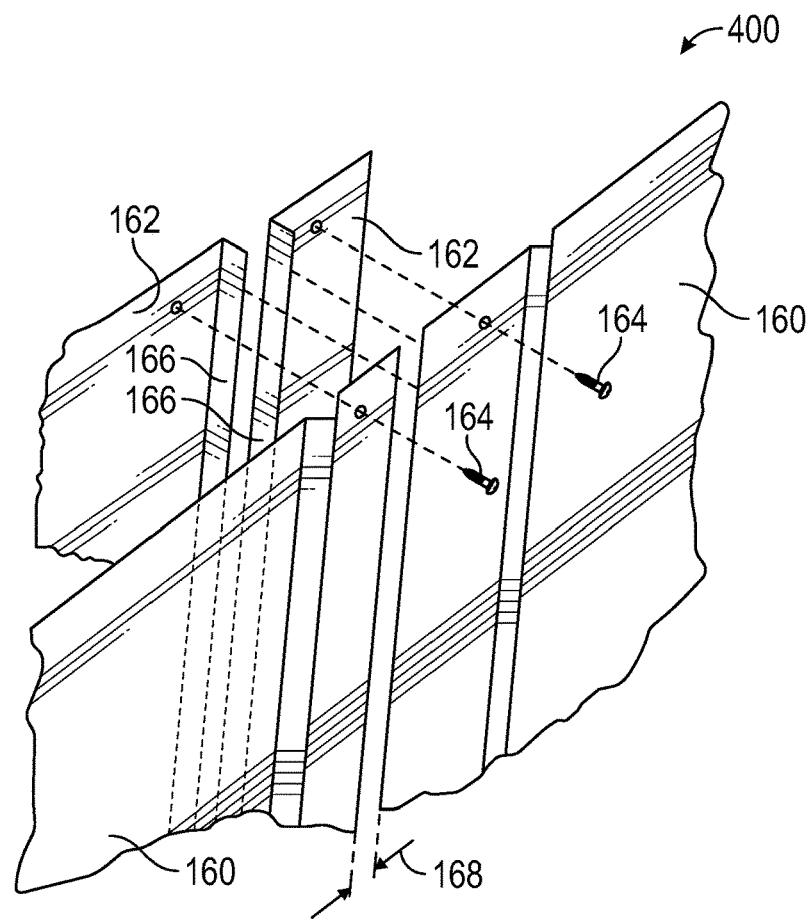
FIG. 9 is an exploded view of a nozzle and how it attaches to a heated air or other heated fluid plenum panel using screws.

FIG. 9 is an exploded view of a slot nozzle 400 construction useful in the present ovens and methods. Sheet metal panels 160 of the plenum are provided, and a set of vertical sheet metal nozzles 162 are attached thereto with screws 164. The design of the airflow pattern is unique due to the requirement of circulating air from the combustion/recirculation chambers, through the hot air supply plenums, and then the cooled air return plenums back to the combustion/recirculation chambers. The nozzle design, having lips or projections 166 that protrude out through gap 168 between plenum panels 160, was based on having adjustable nozzles capable of focusing the flow of hot air downward onto and through the pipe couplings. The nozzles were designed and manufactured by Epcon Industrial Systems, LP, The Woodlands, Tex., USA, the assignee of the present application. The slot nozzles are attached to the plenum panels using sheet metal screws, which allows the nozzles to be adjusted forward or rearward (when the slot nozzles are generally transverse to the conveyor direction—which is not strictly necessary), depending on the depth that the screws are driven into their receptacles. Alternative nozzles may be used, such as round nozzles that are direction-adjustable, such as when they are held by a socket.

Figure 10:
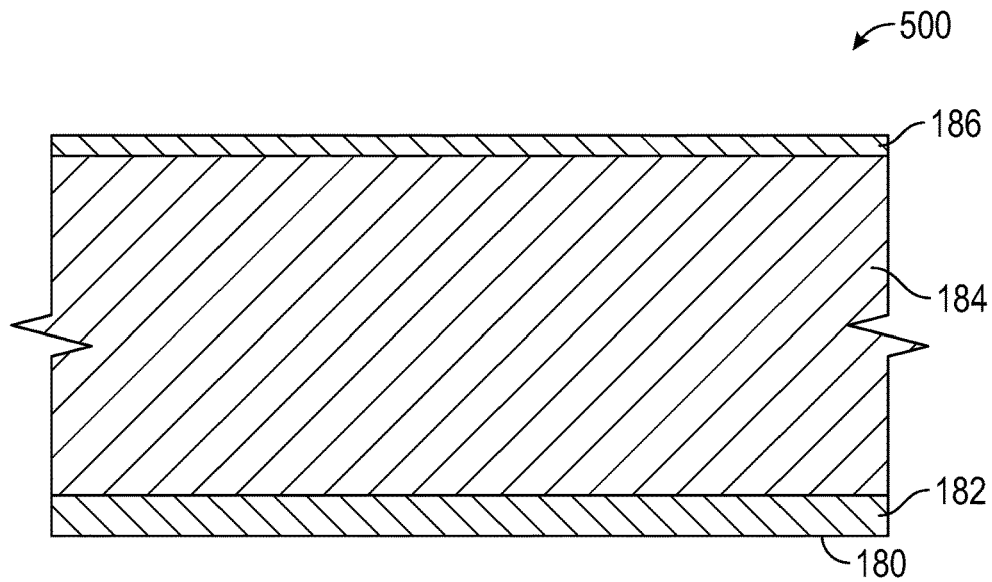
FIG. 10 is a detailed cross-section of a wall of the embodiment of FIGS. 4-6 and 8.

FIG. 10 is a detailed cross-section of a wall 500 of the embodiment of FIGS. 4-6 and 8, featuring insulating material 184, which may be mineral wool, glass wool or other insulating material, for example 6 inch thick 8 pound density mineral wool, sandwiched between an external wall panel 186, for example 18 gage carbon steel primed and painted, and an internal wall panel 180, for example aluminized 18 gauge carbon steel or stainless steel, such as 304 or other stainless steel. A thinner layer 182, such as 1 inch thick "white blanket" insulation may also be employed, such as the fiber glass wool insulation known under the trade designation THERMORANGE®, available form Owens Corning, Toledo, Ohio, USA. More exotic metals may be used for all or portions of the internal wall panel 180, if desired, such as precious metals and/or noble metals (or alloys). Noble metals and/or other exotic corrosion and/or fatigue-resistant materials include metals such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an alloy attached to a base metal using brazing, welding or soldering of certain regions.

Figure 11:
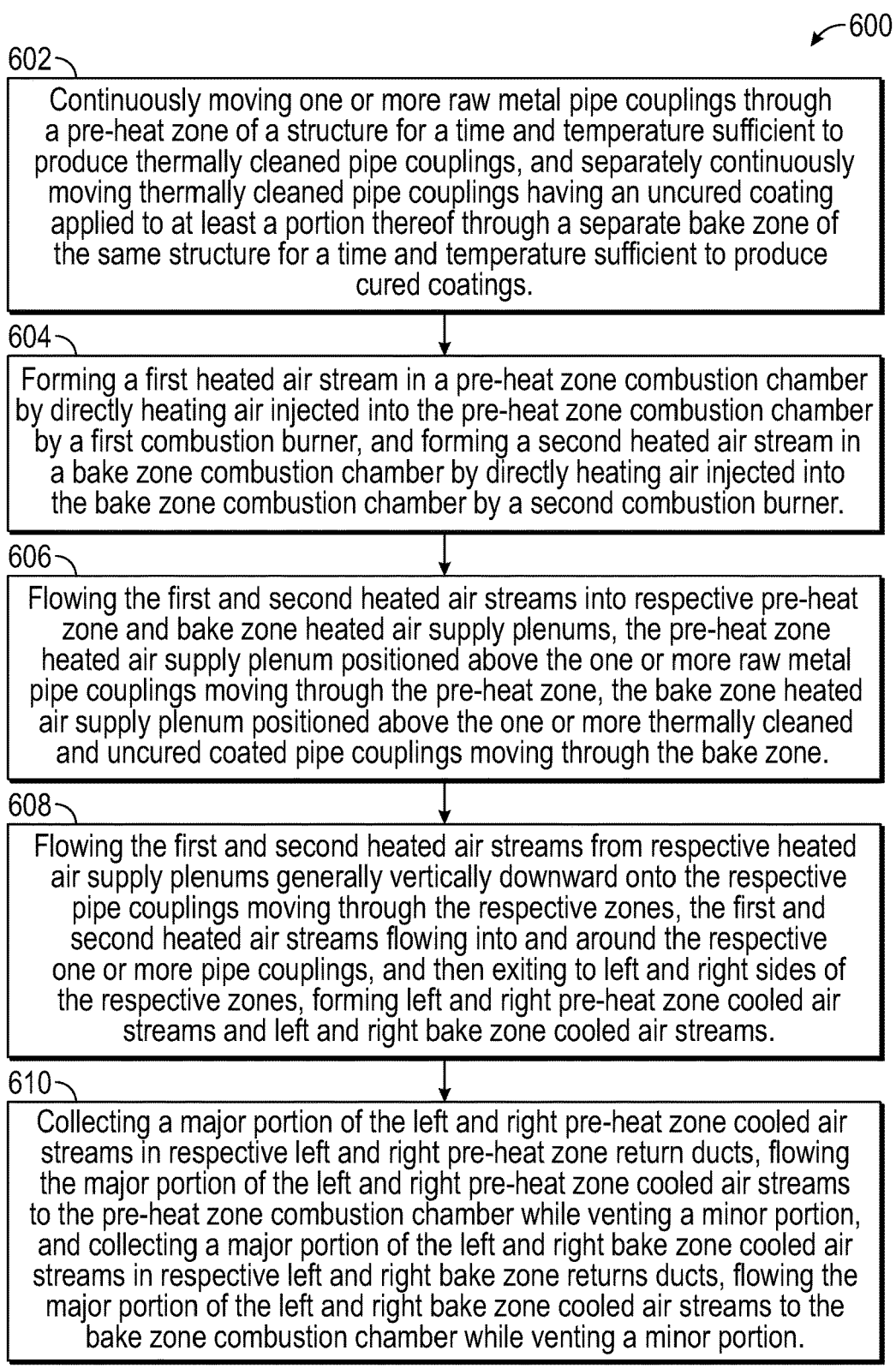
FIG. 11 is a logic diagram of one method embodiment of treating metal pipe couplings in accordance with the present disclosure.

FIG. 11 is a logic diagram of one method embodiment 600 of treating metal pipe couplings in accordance with the present disclosure, comprising the step of continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce coating-cured pipe couplings (Box 602). Method embodiment 600 further comprises forming a first heated air stream in a pre-heat zone combustion chamber by directly heating air injected into the pre-heat zone combustion chamber by a first combustion burner, and forming a second heated air stream in a bake zone combustion chamber by directly heating air injected into the bake zone combustion chamber by a second combustion burner (Box 604). Method embodiment 600 further comprises flowing the first and second heated air streams into respective pre-heat zone and bake zone heated air supply plenums, the pre-heat zone heated air supply plenum positioned above the one or more raw metal pipe couplings moving through the pre-heat zone, the bake zone heated air supply plenum positioned above the one or more thermally cleaned and uncured coated pipe couplings moving through the bake zone (Box 606). Method embodiment 600 further comprises flowing the first and second heated air streams from respective heated air supply plenums generally vertically downward onto the respective pipe couplings moving through the respective zones, the first and second heated air streams flowing into and around the respective one or more pipe couplings, and then exiting to left and right sides of the respective zones, forming left and right pre-heat zone cooled air streams and left and right bake zone cooled air streams (Box 608). Method embodiment 600 further comprises collecting a major portion of the left and right pre-heat zone cooled air streams in respective left and right pre-heat zone return ducts, flowing the major portion of the left and right pre-heat zone cooled air streams to the pre-heat zone combustion chamber while venting a minor portion, and collecting a major portion of the left and right bake zone cooled air streams in respective left and right bake zone return ducts, flowing the major portion of the left and right bake zone cooled air streams to the bake zone combustion chamber while venting a minor portion (Box 610).

Certain system and method embodiments may include an incinerator and pollution control section, such as described in my previous U.S. Pat. No. 4,322,203. Briefly, such an incinerator section comprises an insulated, multi-compartment enclosure having a bottom opening receiving fume-laden air from the oven, such as through the vent conduits previously described, or through a separate conduit having an open end for withdrawing fume-laden air from the oven. The incinerator section may contain conventional heat exchanger and incinerator components, such as a heat exchanger having two portions for two-stage heat exchange, where the bottom opening communicates with one side of the heat exchanger to conduct fume-laden gases to the other side thereof and thence through a passage to return through the other half of the heat exchanger for discharge into an incinerator unit which includes one or more burners. The fume-laden air is thus preheated in the heat exchanger prior to entering incinerator unit. The incinerator unit and burner are appropriately sized to burn the hydrocarbon fumes, and other combustible matter, in the fume-laden air drawn from the oven. The combustion of the combustible components in the fume-laden air is completed largely in the passage or chamber described. A combustion chamber opens through another passage extending through the heat exchanger in heat exchange relation with the fume-laden air passing through the heat exchange conduits. Further details may be seen in my previous '203 patent.

"Left" and "right" are arbitrarily chosen as viewed from the front end wall 8 of the structure of embodiment 200 as illustrated schematically in FIG. 4.

Suitable heated fluid (preferably hot air) recirculation blowers have a capacity ranging from about 1,000 to about 50,000, CFM, or from about 2,000 to about 10,000 CFM, and use an electric motor driver with variable flow, such as having a power of about 1 to about 10 HP, or from about 1 to 5 HP. Such blowers are commercially available, for example, from New York Blower Company, Willowbrook, Ill., U.S.A. Suitable vent air blowers may have a capacity of about 500 to about 5000 standard cubic feet per minute (SCFM), or from about 500 to about 2000 SCFM, driven by a 1 to 5 HP variable frequency drive motor, such as available from New York Blower Company, Willowbrook, Ill., U.S.A.

During operation of embodiments 100, 200 and other embodiments described herein, the oven pre-heat and bake zones, and plenum internals may include one or more airflow diverters (baffles and the like) for effecting direct heat exchange from hot air or hot combustion products to the pipe couplings, or to direct cooled air to the combustion/recirculation chambers. Airflow diverters may for example comprise one or more baffles, distributor plates, grids, and the like for causing a tortuous flow path. Airflow diverters may take any shape, for example flat plates, corrugated plates, plates having a variety of projections or protuberances therefrom such as spikes, knobs, lumps, bumps, and the like, of a variety of sizes, or all the same size. Flow of airstreams is preferably continuous, or at least semi-continuous, while there is a load of pipe couplings being treated in the structure. Airflows may be continued while there are no couplings being treated, but may also be reduced or stopped.

Combustion burners useful in the systems and methods described herein may take fuel feed through a primary fuel supply conduit, a fuel primary flow regulator, which then splits into right side and left side fuel supply conduits configured to feed right side and left side combustion burners, which also take in air through separate connections, or air blowers if desired. One or more fuel mass flow controllers may be employed in each fuel supply conduit to each burner. Burners may be, and preferably are attached directly to front and rear end walls.

The inside structure of heated air supply plenums 68, 69 comprises a series of slits, holes, and/or other shaped passages (nozzles) allowing the heated air to escape the plenums downward and travel through and around the pipe couplings as previously described. The combination of positive pressure from recirculation air blowers 16, 18 and reduced pressure induced by exhaust fan 70 aide air flows and allows a cyclic air flow pattern as illustrated.

Methods and systems of the present disclosure may include one or more thermocouples for temperature monitoring and control, NOx sensors, and/or moisture sensors for monitoring and/or control of temperature of the pipe coupling treatment, for example using a controller. In certain methods and systems, control of fuel and/or oxidant may be adjustable with respect to flow of the fuel or oxidant or both. Adjustment may be via automatic, semi-automatic, or manual control. A signal may be transmitted by wire or wirelessly from a thermocouple or other sensor to a controller, which may control the method and system by adjusting any number of parameters, for example airflow rate may be adjusted through use of a signal to one or more air recirculation blowers; one or more of flow rate of fuel and/or oxidant may be adjusted via one or more signals, it being understood that suitable transmitters and actuators, such as valves and the like, are not illustrated for clarity.

Methods and systems in accordance with the present disclosure may also comprise one or more oxy-fuel burners, but as they are only used in certain situations, are more likely to be air/fuel burners. In certain embodiments, all combustion burners and burner panels may be oxy/fuel burners or oxy-fuel burner panels (where "oxy" means oxygen, or oxygen-enriched air, as described earlier), but this is not necessarily so in all embodiments; some or all of the combustion burners or burner panels may be air/fuel burners. Furthermore, heating may be supplemented by electrical (Joule) heating in certain embodiments, in certain zones. Oxy-fuel burners and technologies provide high heat transfer rates, fuel consumption reductions (energy savings), reduced volume of flue gas, and reduction of pollutant emission, such as oxides of nitrogen (NOx), carbon monoxide (CO), and particulates. Despite the reduction of the flue gas volume that the substitution of combustion air with pure oxygen or oxygen-enriched air yields, a significant amount of energy may be lost in the flue gas (also referred to herein as combustion products, exhaust or exhaust gases), especially for high temperature processes. It would be advantageous to recover some of the energy available from the flue gas in order to improve the economics of operating an oxy-fuel fired oven. One technique consists in using the energy available in the flue gas to preheat the pipe couplings before loading them into the oven. The energy exchange between the flue gas and the raw pipe couplings may be carried out in a preheater. Other methods may use the heat in the flue gases to heat other fluids or materials useful in a treatment facility, and then use that heat to preheat raw pipe couplings, or fuel or oxidant used in furnaces.

Certain systems, apparatus, and method embodiments of this disclosure may be controlled by one or more controllers. For example, combustion (flame) temperature may be controlled by monitoring one or more parameters selected from velocity of the fuel, velocity of the oxidant, mass and/or volume flow rate of the fuel, mass and/or volume flow rate of the oxidant, energy content of the fuel, temperature of the fuel as it enters burners or burner panels, temperature of the oxidant as it enters burners or burner panels, temperature of the effluent (exhaust) at the burner exhaust exit, pressure of the oxidant entering burners or burner panels, humidity of the oxidant, burner or burner panel geometry, combustion ratio, and combinations thereof. Flow diverter positions may be adjusted or controlled to increase heat transfer in heat transfer substructures and exhaust conduits.

Various conduits, such as fuel and oxidant supply conduits, exhaust conduits, plenums, partition walls, and airflow ducts of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight of the systems and/or space required. In certain locations, precious metals and/or noble metals (or alloys) may be used for portions or all of these conduits. Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions.

The choice of a particular material for any component is dictated among other parameters by the chemistry, pressure, and temperature of fuel and oxidant used, size and composition of pipe coupling being treated and type of product to be produced with certain feedstocks. The skilled artisan, having knowledge of the particular application, pressures, temperatures, and available materials, will be able design the most cost effective, safe, and operable plenums, chambers, exhaust conduits, burners, burner panels, and ovens for each particular application without undue experimentation.

The total quantities of fuel and oxidant used by burners or burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. The amount of heat needed to be produced by combustion of fuel in the burners (and/or Joule heating) will depend upon the efficiency of any preheating of the feedstock. The larger the amount of heat transferred to the feedstock, the lower the heat energy required in the oven from the fuel and/or Joule elements.

In burners used in the presently disclosed systems and methods, the velocity of the fuel in the various burners and/or burner panel embodiments depends on the burner/burner panel geometry used. The upper limit of fuel velocity depends primarily on the desired temperature of the hot combustion gases and the geometry of the burner; if the fuel velocity is too low, the flame temperature may be too low, providing inadequate temperature in the oven, which is not desired, and if the fuel flow is too high, flame and/or combustion products might impinge on a blower or structural panel, or be wasted, which is also not desired. Similarly, oxidant velocity should be monitored so that flame and/or combustion products do not impinge on blowers or structural surfaces, or be wasted. Oxidant velocities depend on fuel flow rate and fuel velocity. Suitable burners include the nozzle-mixing, gas fired, refractory-less burners known under the trade designation WINNOX, from Eclipse, Inc., and available from Elster Thermal Solutions, Rockford, Ill., U.S.A., and may have a heat output ranging from about 0.5 to about 10 million Btu/hr., or from about 0.5 to about 5 million Btu/hr., and having a combustion air fan, from 1 to 5 HP. Such burners are able to burn natural gas, propane, and butane, and feature low NOx operation ideal for air heating and oven applications, are modular in design, incorporates direct-spark ignition and an air/gas regulator resulting in efficient firing over a wide gas turn down range, all done at a controlled ratio, producing an intense, short, swirled flame completely contained within the firing tube. The burner nozzle produces an intense mixing of air and fuel.

A combustion and/or Joule heating process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner panel control elements, and/or to local devices associated with burner panel control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A method comprising:
   (a) continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce coating-cured pipe couplings;
   (b) forming a first hot fluid stream in a pre-heat zone hot fluid chamber, and forming a second hot fluid stream in a bake zone hot fluid chamber;
   (c) flowing the first and second hot fluid streams into respective pre-heat zone and bake zone hot fluid supply plenums, the pre-heat zone hot fluid supply plenum positioned above the one or more raw metal pipe couplings moving through the pre-heat zone, the bake zone hot fluid supply plenum positioned above the one or more thermally cleaned and uncured coated pipe couplings moving through the bake zone;
   (d) flowing the first and second hot fluid streams from respective hot fluid supply plenums generally vertically downward onto the respective pipe couplings moving through the respective zones, the first and second hot fluid flowing into and around the respective one or more pipe couplings, and then exiting to left and right sides of the respective zones, forming left and right pre-heat zone cooled fluid streams and left and right bake zone cooled fluid streams; and
   (e) collecting a major portion of the left and right pre-heat zone cooled fluid streams in respective left and right pre-heat zone return ducts, flowing the major portion of the left and right pre-heat zone cooled fluid streams to the pre-heat zone hot fluid chamber while venting a minor portion, and collecting a major portion of the left and right bake zone cooled fluid streams in respective left and right bake zone return ducts, flowing the major portion of the left and right bake zone cooled fluid streams to the bake zone hot fluid chamber while venting a minor portion, wherein the venting of the minor portions comprises exhausting minor portions of the cooled streams at a rate and amount sufficient to maintain a negative pressure in and near inlet and outlet vestibules of the pre-heat and bake zones.

2. The method of claim 1 wherein the hot fluid streams are hot combustion products, and the hot fluid chambers are combustion chambers, and the hot combustion products are formed by combusting one or more fuels with one or more oxidants in one or more combustion burners attached to the structure externally of the respective combustion chambers, the one or more combustion burners exhausting directly into the respective combustion chambers.

3. The method of claim 2 wherein the forming a first hot combustion product comprises forming a directly heated air, oxygen-enriched air, or oxidant stream in the pre-heat zone combustion chamber by directly heating air, oxygen-enriched air, or oxidant injected into the pre-heat zone combustion chamber by a first combustion burner, and the forming a second hot combustion product comprises forming a directly heated air, oxygen-enriched air, or oxidant stream in the bake zone combustion chamber by directly heating air, oxygen-enriched air, or oxidant injected into the bake zone combustion chamber by a second combustion burner.

4. The method of claim 2 wherein the fuel is natural gas, the oxidant is air, and the first and second hot combustion product streams are first and second directly heated air streams.

5. The method of claim 1 wherein steps (b)-(e) are continuous and are carried out simultaneously with step (a).

6. The method of claim 1 wherein step (a) comprises continuously moving one or more raw metal pipe couplings through the pre-heat zone of the structure horizontally, and separately continuously moving the thermally cleaned pipe couplings having an uncured coating applied to at least a portion thereof through the separate bake zone of the same structure horizontally, both continuous movements being parallel to a longitudinal axis of the structure.

7. The method of claim 6 wherein the horizontal movements are in opposite directions.

8. The method of claim 1 wherein the fuel is selected from the group consisting of methane, gaseous natural gas, liquefied natural gas, propane, butane, hydrogen, steam-reformed natural gas, atomized hydrocarbon oil, combustible powders, flowable solids, waste materials, slurries, and mixtures or other combinations thereof, and the oxidant is selected from the group consisting of air, gases having the same molar concentration of oxygen as air, oxygen-enriched air having 50 mole percent or more oxygen, industrial grade oxygen, food grade oxygen, and cryogenic oxygen.

9. The method of claim 1 wherein the time and temperature sufficient to produce thermally cleaned pipe couplings ranges from about 1 to about 4 hours at temperature ranging from about 600° F. to about 800° F., and the time and temperature sufficient to produce cured coatings ranges from about 1 to about 4 hours at temperature ranging from about 350° F. to about 550° F.

10. The method of claim 2 comprising controlling thermal cleaning of the one or more pipe couplings by one or more control methods selected from the group consisting of monitoring composition of the vented fluid from the pre-heat zone, temperature of the pre-heat zone combustion chamber, temperature of raw pipe couplings moving though the pre-heat zone, fuel and/or oxidant flow rate to the one or more pre-heat zone combustion burners, rate of moving the raw pipe couplings thought the pre-heat zone, and combinations thereof, and controlling baking of the coating of the one or more pipe couplings by one or more control methods selected from the group consisting of monitoring composition of vented fluid from the bake zone, temperature of the bake zone combustion chamber, temperature of thermally cleaned and uncured coated pipe couplings moving though the bake zone, fuel and/or oxidant flow rate to the one or more bake zone combustion burners, rate of moving the thermally cleaned uncured coated pipe couplings thought the bake zone, and combinations thereof.

11. A method comprising:
(a) continuously moving one or more raw metal pipe couplings through a pre-heat zone of a structure for a time and temperature sufficient to produce thermally cleaned pipe couplings, and separately continuously moving thermally cleaned pipe couplings having an uncured coating applied to at least a portion thereof through a separate bake zone of the same structure for a time and temperature sufficient to produce coating-cured pipe couplings;
(b) forming a first heated air stream in a pre-heat zone combustion chamber by directly heating air injected into the pre-heat zone combustion chamber by a first combustion burner, and
forming a second heated air stream in a bake zone combustion chamber by directly heating air injected into the bake zone combustion chamber by a second combustion burner;
(c) flowing the first and second heated air streams into respective pre-heat zone and bake zone heated air supply plenums, the pre-heat zone heated air supply plenum positioned above the one or more raw metal pipe couplings moving through the pre-heat zone, the bake zone heated air supply plenum positioned above the one or more thermally cleaned and uncured coated pipe couplings moving through the bake zone;
(d) flowing the first and second heated air streams from respective heated air supply plenums generally vertically downward onto the respective pipe couplings moving through the respective zones, the first and second heated air streams flowing into and around the respective one or more pipe couplings, and then exiting to left and right sides of the respective zones, forming left and right pre-heat zone cooled air streams and left and right bake zone cooled air streams; and
(e) collecting a major portion of the left and right pre-heat zone cooled air streams in respective left and right pre-heat zone return ducts, flowing the major portion of the left and right pre-heat zone cooled air streams to the pre-heat zone combustion chamber while venting a minor portion, and collecting a major portion of the left and right bake zone cooled air streams in respective left and right bake zone return ducts, flowing the major portion of the left and right bake zone cooled air streams to the bake zone combustion chamber while venting a minor portion, wherein the venting of the minor portions comprises exhausting minor portions of the cooled streams at a rate and amount sufficient to maintain a negative pressure in and near inlet and outlet vestibules of the pre-heat and bake zones.

12. Coating-cured pipe couplings made according to the method of claim 1.

13. Coating-cured pipe couplings made according to the method of claim 11.

* * * * *